(12) United States Patent
Proulx et al.

(10) Patent No.: US 10,896,279 B2
(45) Date of Patent: Jan. 19, 2021

(54) DETERMINATION OF STRUCTURE FUNCTION FEATURE CORRELATION TO THERMAL MODEL ELEMENT LAYERS

(71) Applicant: Mentor Graphics Corporation, Wilsonville, OR (US)

(72) Inventors: Joseph Charles Proulx, New Boston, NH (US); Byron Blackmore, Dartmouth (CA); Robin Bornoff, Herefordshire (GB); Andras Vass-Varnai, Seoul (KR)

(73) Assignee: Mentor Graphics Corporation, Wilsonville, OR (US)

( * ) Notice: Subject to any disclaimer, the term of this patent is extended or adjusted under 35 U.S.C. 154(b) by 454 days.

(21) Appl. No.: 15/792,158

(22) Filed: Oct. 24, 2017

(65) Prior Publication Data

US 2018/0314782 A1 Nov. 1, 2018

Related U.S. Application Data

(60) Provisional application No. 62/491,441, filed on Apr. 28, 2017.

(51) Int. Cl.
| | |
|---|---|
| *G06F 30/367* | (2020.01) |
| *G01R 31/3183* | (2006.01) |
| *G06F 30/20* | (2020.01) |
| *G06F 119/08* | (2020.01) |

(52) U.S. Cl.
CPC ... *G06F 30/367* (2020.01); *G01R 31/318357* (2013.01); *G06F 30/20* (2020.01); *G06F 2119/08* (2020.01)

(58) Field of Classification Search
None
See application file for complete search history.

(56) References Cited

PUBLICATIONS

Rencz, M et al., "Increasing the Accuracy of Structure Function Based Evaluation of Thermal Transient Measurements", 2004, Inter Society Conference on Thermal Phenomena, IEEE. (Year: 2004).*
Mitterhuber, Lisa et al., "Validation Methodology to Analyze the Temperature-Dependent Heat Path of a 4-Chip LED Module using a Finite Volume Simulation", Apr. 21, 2017, Microelectronics Reliability 79, Elsevier, Ltd. (Year: 2017).*
Janicki, M. et al., "Investigation of Circuit Thermal Models Based on the Transient Thermal Response Spectra", Jun. 19-21, 2008, 15th International Conference Mixed Design, Technical University of Lodz. (Year: 2008).*

(Continued)

*Primary Examiner* — Cedric Johnson

(57) ABSTRACT

A thermal transient response simulation is performed to determine a total thermal resistance value for a structure having a plurality of thermal model elements. A plurality of thermal transient response simulations are also performed for the structure to determine changed total thermal resistance values by varying one of thermal resistance values of the thermal model elements. Thermal resistance values for the thermal model elements are then determined based on the total thermal resistance value and the changed total thermal resistance values. The structure function is divided into portions associated with the thermal model elements based on the thermal resistance values for the thermal model elements.

18 Claims, 8 Drawing Sheets

(56) References Cited

PUBLICATIONS

Natarajan, Shweta et al., "Measuring the Thermal Resistance in Light Emitting Diodes Using a Transient Thermal Analysis Technique", Aug. 2013, IEEE Transactions on Electron Devices, vol. 60, No. 8, IEEE. (Year: 2013).*

R. Bornoff and A. Vass-Varnai: "A Detailed IC Package Numerical Model Calibration Methodology" Semiconductor Thermal Measurement and Management Symposium (SEMI-THERM), 2013, 29th Annual IEEE, p. 65-70.

A. Vass-Varnai, R. Bornoff, S. Ress, Y. Luo, A. Poppe, G. Farkas, M. Rencz: "Thermal Solutions and Measurements—a Combined Approach for Package Characterization", Therminic 2006.

Y. Luo: "Structure Function Based Thermal Resistance & Thermal Capacitance Measurement for Electronic System", 21st IEEE Semi-Therm Symposium, 2010, p. 1-5.

JEDEC Standard, JESD51-14, "Transient Dual Interface Test Method for the Measurement of the Thermal Resistance Junction to Case of Semiconductor Devices with Heat Flow Trough a Single Path", Nov. 2010.

Y. Luo: "Use Isothermal Surface to Help Understanding the Spacial Representation of Structure Function", Transactions of the Japan Institute of Electronics Packaging, vol. 5, No. 1, 2012, p. 62-68.

* cited by examiner

| Die ($Rl_1$) 410 | Die-DA Contact ($Rl_2$) 420 | Die Attach ($Rl_3$) 430 | Copper in Device ($Rl_4$) 440 | TIM Contact ($Rl_5$) 450 | Copper Cold Plate ($Rl_6$) 460 |

DETERMINATION OF STRUCTURE FUNCTION FEATURE CORRELATION TO THERMAL MODEL ELEMENT LAYERS

RELATED APPLICATIONS

This application claims the benefit of U.S. Provisional Patent Application No. 62/491,441, filed on Apr. 28, 2017, and naming Joseph Charles Proulx et al. as inventors, which application is incorporated entirely herein by reference.

FIELD OF THE DISCLOSED TECHNOLOGY

The present disclosed technology is directed to the thermal analysis. Various aspects of the disclosed technology may be particularly useful for calibrating thermal models for circuit packages.

BACKGROUND OF THE DISCLOSED TECHNOLOGY

High operating temperatures can severely affect the performance, power consumption and reliability of a circuit system. With the continued scaling of integrated circuit technologies, high power density and the resulting difficulties in managing temperatures have become a major challenge for designers at all design levels. Historically, temperature sensors such as thermal couples have been used to measure the thermal resistance of electronic packages for thermal characterization. The measurement result is, however, prone to errors and not sufficiently reproducible. One problem is a potential temperature distribution at the package case while the thermocouple measures the temperature just at its contact point to the case. Another problem is that thermocouple bead is often not sufficiently insulated against the cold plate and could therefore be cooled from the wire and cold plate side. The interface thermal resistance between the case and the thermocouple may also play a role. A further issue with thermocouples is that they cannot measure the temperature of the internal structure, yet by design the dominant heat flow path is from the junction, through many materials and material interfaces before passing into a PCB or heat sink. Thermocouples are therefore a "blunt instrument" when it comes to thermal design verification.

The thermal transient measurement technique has been introduced to overcome the disadvantages of the direct temperature measurement. In a thermal transient measurement, a step power is applied to a structure of interest and the response of the structure is recorded and analyzed. For example, an electronic package containing a bipolar junction transistor is powered to a certain power value and left until it reaches a steady state condition. The package is then powered off and the resulting junction temperature response is measured using a specialized tool such as the commercial T3 Ster® system available from Mentor Graphics Corporation of Wilsonville, Oreg. The thermal transient measurement can generate a curve of normalized transient thermal impedance (Zth) with the transient thermal impedance being calculated from the temperature change in time.

The Zth curve is in time domain and does not show structural information. It has been demonstrated that a thermal system can be treated as a distributed thermal RC (resistance-capacitance) network. Thermal resistance and thermal capacitance of thermal model elements on the heat flow path determine step power response of the system. The Zth curve can be converted to a structure function (also referred to as cumulative structure function or thermal structure function) showing cumulative thermal capacitance as a function of the cumulative thermal resistance. The structure function can be divided into parts or portions corresponding to layers of the thermal model elements on the heat flow path. This allows the identification of partial thermal resistances and partial thermal capacitances on the heat flow path not only inside the device package like die attach, but also outside electronic components such as PCB board, surface-air boundary layer, and contact thermal resistance. It can also help with calibrating the thermal model for thermal transient response simulations.

It is not trivial to determine which part of the structure function corresponds to which thermal model element, however. Several conventional approaches all have their own advantages and disadvantages.

The first one is based on isothermal surfaces. Knowing the resistance value that a structure function feature occurs at, one can determine the temperature value at which this resistance relates to (Tj−(Resistance/Power)). Those objects that are bisected by the simulated iso-surface of that temperature, and carry the majority of the heat flow in the steady state power on condition, are those that may be responsible for that resistance. This would be a reliable approach if the temperature variation at the object interface into which heat flows had a uniform temperature. In many parts of a package model this is not the case and so such an approach does not always indicate correctly which objects correlate to which structure function resistances.

An alternative approach is to note that time at which the resistance in question "occurs at" then to study the simulated heat flux distribution at that time point. The fore front of the heat flux field (using the "power on" approach to determine the thermal impedance curve) should be experiencing the object that is responsible for that resistance, at that time. If the resistances that are apparent on the structure function are sensed at one point in time then again, this would be a reliable approach. However the structure function resistances are built up as heat starts to pass through the object, soaks into it then passes through it.

A more full-proof approach is to make perturbations to the numerical model at known locations and compare how these relate to differences in resulting structure functions. More reliable as is, the perturbation method is a computationally expensive approach. Sometimes it can also be difficult to determine the separation point using this method.

BRIEF SUMMARY OF THE DISCLOSED TECHNOLOGY

Aspects of the disclosed technology relate to techniques for determining structure function feature correlation to thermal model element layers. In one aspect, there is a method, executed by at least one processor of a computer, comprising: performing a thermal transient response simulation for a structure having a plurality of thermal model elements, the thermal transient response simulation determining a structure function and a total thermal resistance value, a heat flow path in the structure passing through layers of the thermal model elements; performing a plurality of thermal transient response simulations for the structure to determine changed total thermal resistance values by varying one of thermal resistance values of the thermal model elements, each of the changed total thermal resistance values being associated with a particular thermal model element in the thermal model elements; determining thermal resistance values for the thermal model elements based on the total thermal resistance value and the changed total thermal resistance values; and associating portions of the structural function with the thermal model elements based on the thermal resistance values for the thermal model elements.

The method may further comprise: calibrating a thermal model of the structure used by the thermal transient response simulation based on analyzing the portions of the structural function and a structure function derived from an experimental measurement.

The varying one of thermal resistance values of the thermal model elements may be doubling one of thermal resistance values of the thermal model elements, and wherein the determining thermal resistance values for the thermal model elements comprising subtracting the total thermal resistance value from each of the changed total thermal resistance values. The varying one of thermal resistance values of the thermal model elements may comprise: varying one of specific thermal resistance values of the thermal model elements.

The thermal model elements and an order of the layers of the thermal model elements through which the heat flow passes may be identified by analyzing design data of the structure.

The associating portions of the structural function with the thermal model elements based on the thermal resistance values for the thermal model elements may comprises: stacking the thermal resistance values for the thermal model elements along horizontal axis of the structure function.

In another aspect, there are one or more non-transitory computer-readable media storing computer-executable instructions for causing one or more processors to perform the above method.

In still another aspect, there is a system comprising one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclose techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the disclosed technology relate to techniques for determining thermal model element layer contributions to the structure function. In the following description, numerous details are set forth for the purpose of explanation. However, one of ordinary skill in the art will realize that the disclosed technology may be practiced without the use of these specific details. In other instances, well-known features have not been described in details to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of a computational fluid dynamics (CFD) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine", "perform" and "associate" to describe the disclosed methods. Such terms are high-level abstractions of the actual operations that are performed. The actual operations that correspond to these terms will vary depending on the particular implementation and are readily discernible by one of ordinary skill in the art.

Illustrative Operating Environment

Figure 1:
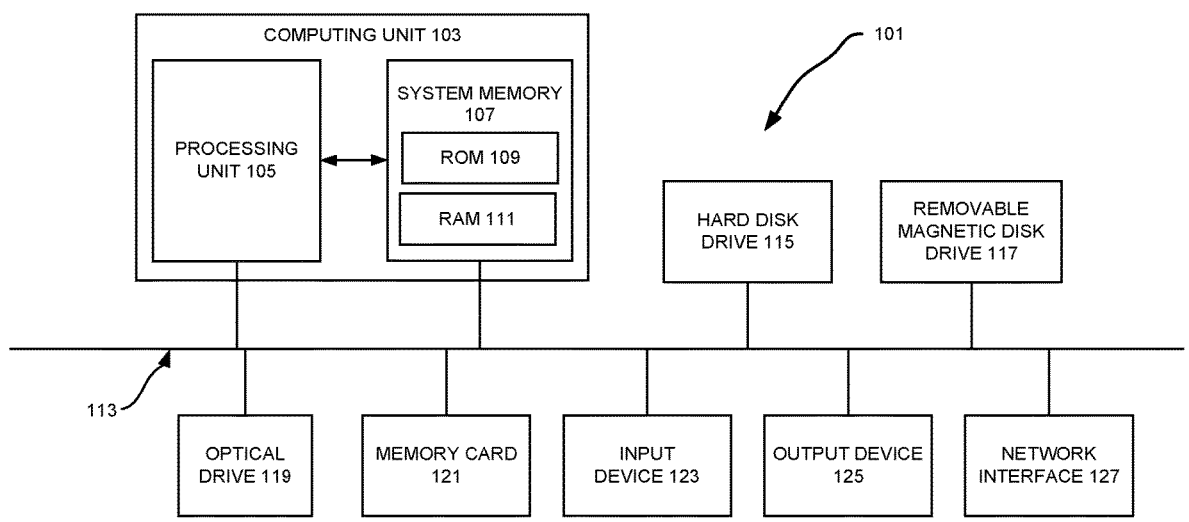
FIG. 1 illustrates an example of a programmable computer that may be used to implement a model calibration tool or method according to various embodiments of the disclosed technology.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM)

109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multiprocessor computer, a plurality of single and/or multiprocessor computers arranged into a network, or some combination of both.

Structure Function Analysis Tool

Figure 2:
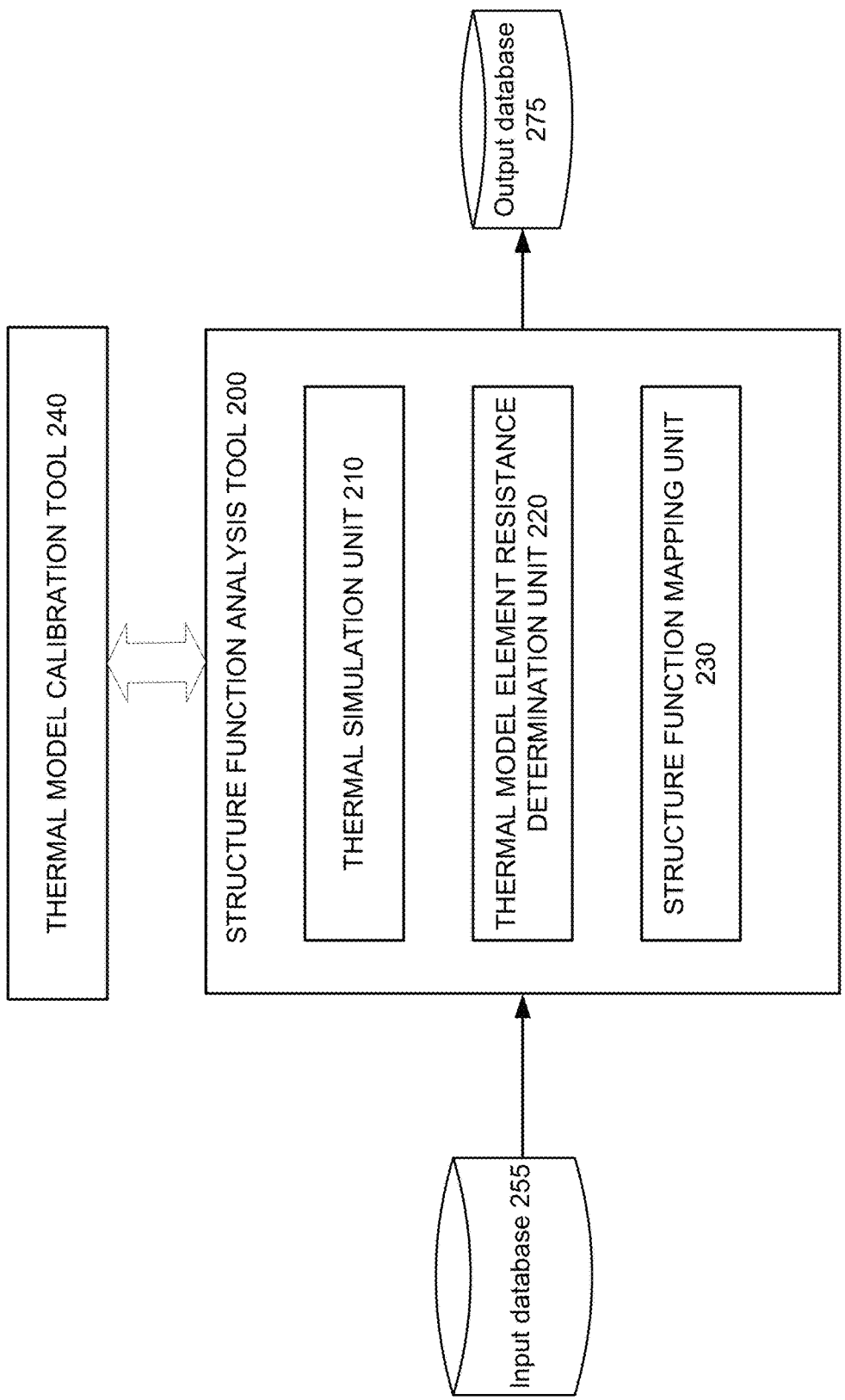
FIG. 2 illustrates a structure function analysis tool according to various embodiments of the disclosed technology.

FIG. 2 illustrates an example of a structure function analysis tool 200 according to various embodiments of the disclosed technology. As seen in this figure, the structure function analysis tool 200 includes a thermal simulation unit 210, a thermal model element resistance determination unit 220, and a structure function mapping unit 230. Some implementations of the model calibration tool 200 may cooperate with (or incorporate) one or more of a thermal model calibration tool 240, an input database 255 and an output database 275.

As will be discussed in more detail below, the thermal simulation unit 210 performs a thermal transient response simulation for a structure. The structure has a plurality of thermal model elements and a heat flow path in the structure passes through layers of the thermal model elements. This thermal transient response simulation determines a structure function and a total thermal resistance value. The information of the structure including information of the thermal model elements and their order on the heat flow path may be received from the input database 255. The thermal simulation unit 210 also performs a plurality of thermal transient response simulations for the structure to determine changed total thermal resistance values by varying one of thermal resistance values of the thermal model elements. Here, each of the changed total thermal resistance values is associated with a particular thermal model element in the thermal model elements.

The thermal model element resistance determination unit 220 determines thermal resistance values for the thermal model elements based on the total thermal resistance value and the changed total thermal resistance values. The structure function mapping unit 230 associates portions of the structural function with the thermal model elements based on the thermal resistance values for the thermal model elements. The mapped structure function may be outputted to the output database 275. The thermal model calibration tool 240 calibrates a thermal model of the structure used by the thermal transient response simulation based on based on analyzing the portions of the structural function.

As previously noted, various examples of the disclosed technology may be implemented by a computing system, such as the computing system illustrated in FIG. 1. Accordingly, one or more of the thermal simulation unit 210, the thermal model element resistance determination unit 220, the structure function mapping unit 230, and the thermal model calibration tool 240 may be implemented by executing programming instructions on one or more processors in a computing system such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the thermal simulation unit 210, the thermal model element resistance determination unit 220, the structure function mapping unit 230, and the thermal model calibration tool 240.

It also should be appreciated that, while the thermal simulation unit 210, the thermal model element resistance determination unit 220, the structure function mapping unit 230, and the thermal model calibration tool 240 are shown as separate units in FIG. 2, a single computer (or a single processor within a master computer) may be used to implement all or some of these units at different times, or components of these units/tool at different times.

With various examples of the disclosed technology, the input database 205 and the output database 285 may be implemented using any suitable computer readable storage device. That is, either of the input database 205 and the output database 285 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 255 and the output database 275 are shown as separate units in FIG. 2, a single data storage medium may be used to implement some or all of these databases.

Determination of Thermal Layer Contributions to Structure Function

Figure 3:
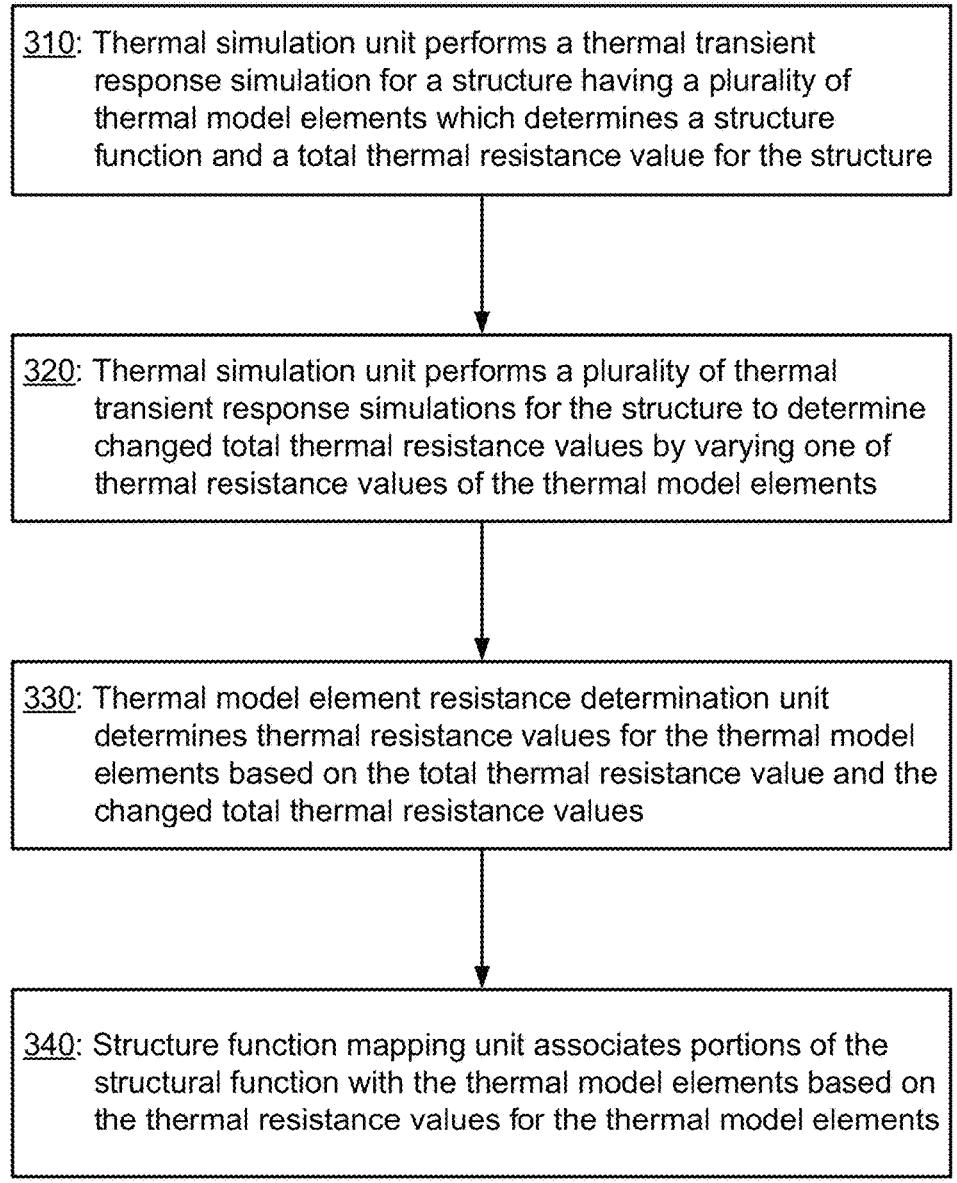
FIG. 3 illustrate a flowchart showing methods for determining thermal layer contributions to the structure function that may be implemented according to various examples of the disclosed technology.

FIG. 3 illustrates a flowchart 300 showing a process of determining thermal layer contributions to the structure function that may be implemented according to various examples of the disclosed technology. For ease of understanding, methods for determining thermal layer contributions to structure function that may be employed according to various embodiments of the disclosed technology will be described with reference to the structure function analysis tool 200 illustrated in FIG. 2 and the flow chart 300 illustrated in FIG. 3. It should be appreciated, however, that alternate implementations of a structure function analysis tool may be used to perform the methods for determining thermal layer contributions to structure function illustrated by the flow chart 300 according to various embodiments of the disclosed technology. In addition, it should be appreciated that implementations of the structure function analysis tool 200 may be employed to implement methods for determining thermal layer contributions to structure function according to different embodiments of the disclosed technology other than the ones illustrated by the flow chart 300.

Figures 4A, 4B:
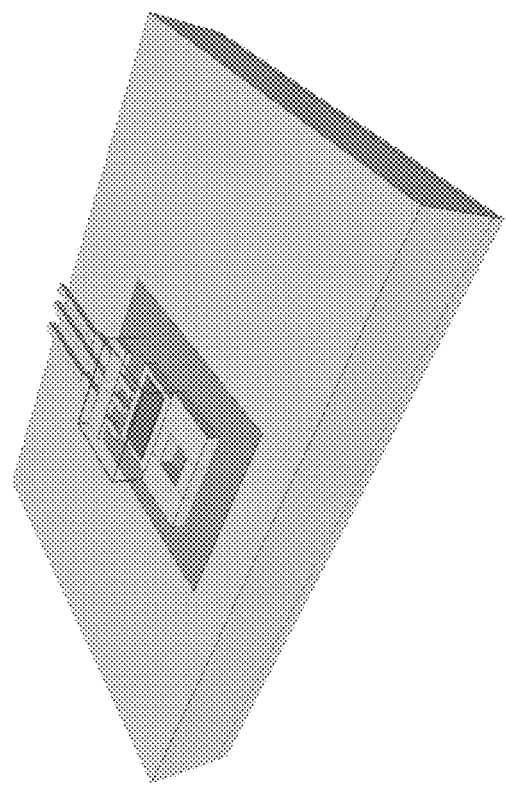
FIG. 4A illustrates a TO-220 electronic component package mounted to a heat sink.
FIG. 4B illustrates layers of thermal model elements in the TO-220 package through which a heat flow path passes.

In operation 310 of the flowchart 300, the thermal simulation unit 210 performs a thermal transient response simulation for a structure having a plurality of thermal model elements. One example of the structure is an electronic package that mounts and interconnects of integrated circuits and other components onto printed-circuits boards. Another example of the structure is an integrated circuit package. The integrated circuit package includes an integrated circuit fabricated on a die. The package also includes parts for encapsulation or seal and heat dissipation. FIG. 4A illustrates such an example—a TO-220 electronic component package mounted to a heat sink. The TO-220 package is a "power package" intended for power electronic devices.

A heat flow path that passes through layers of the thermal model elements in the structure and that carries the majority of heat may be determined using a software tool. One example of the software tool is the FloTHERM® family of software products available from Mentor Graphics Corporation of Wilsonville, Oreg. FIG. 4B illustrates layers of thermal model elements in the TO-220 package through which an identified heat flow path passes. The thermal model elements include die (silicon) 410, contact between die and die attach 420, die attach (solder, glue, et al.) 430, copper in device 440, thermal interface material (TIM) between copper in device and copper cold plate of the heat sink 450, and copper cold plate of the heat sink 460.

Figure 5:
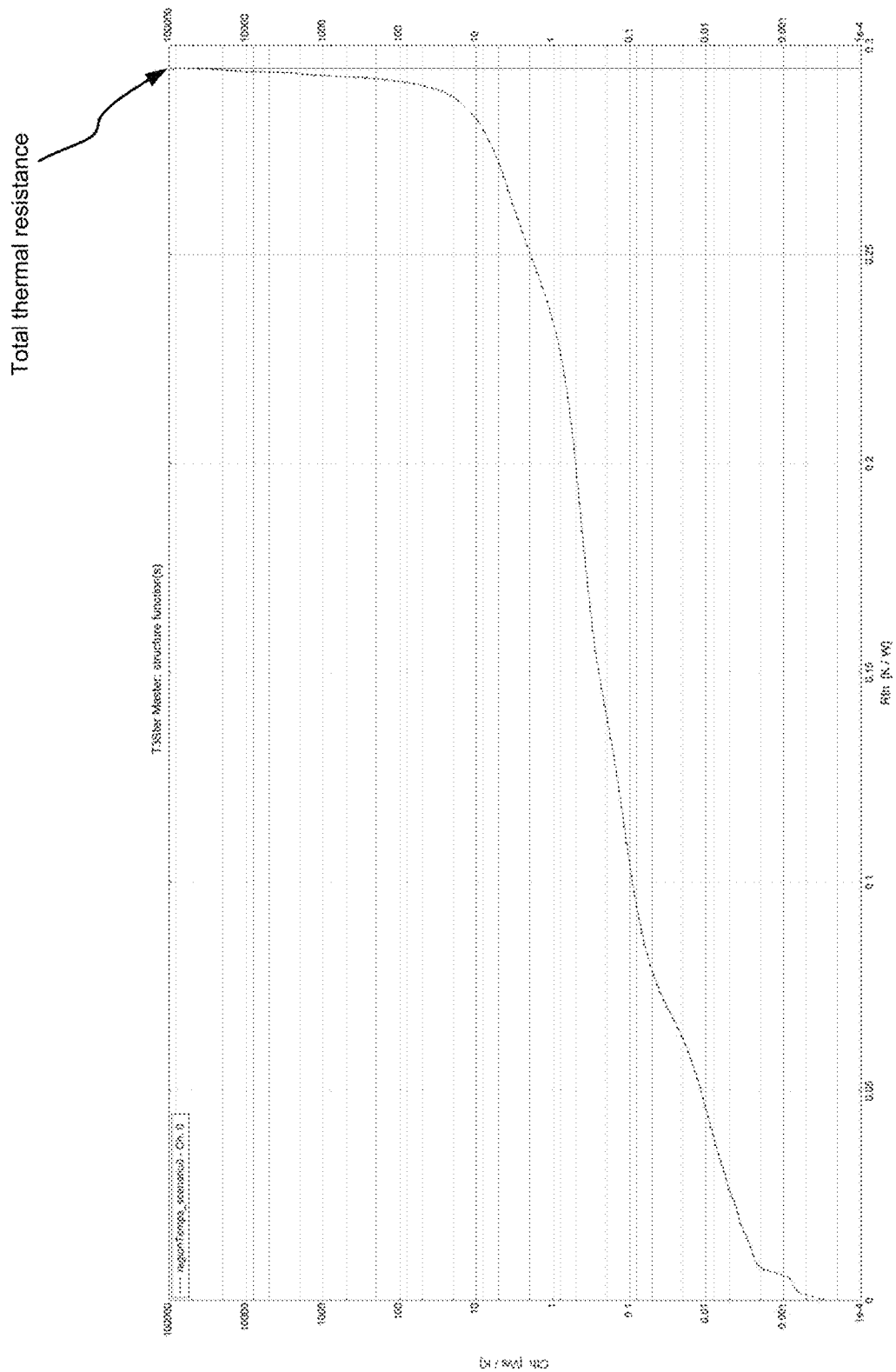
FIG. 5 illustrates a structure function determined by a thermal transient response simulation.

The thermal simulation unit 210 may also be implemented using the thermal simulation tool in the FloTHERM® family. The thermal transient response simulation performed by the thermal simulation unit 210 determines a structure function for the structure and a total thermal resistance value. FIG. 5 illustrates a structure function determined by a thermal transient response simulation for the TO-220 package shown in FIGS. 4A and 4B. The total thermal resistance value is about 0.29 K/W as shown in the figure.

In operation 320, the thermal simulation unit 210 performs a plurality of thermal transient response simulations for the structure to determine changed total thermal resistance values by varying one of thermal resistance values of the thermal model elements. Each of the changed total thermal resistance values is associated with a particular thermal model element in the thermal model elements. The variation of one of thermal resistance values of the thermal model elements may be accomplished by changing the specific thermal resistance value (or the specific thermal conductance value). Alternatively, other parameters may be changed. For example, thickness of a solid layer may be changed to change the thermal resistance value of the solid layer.

Figure 6:
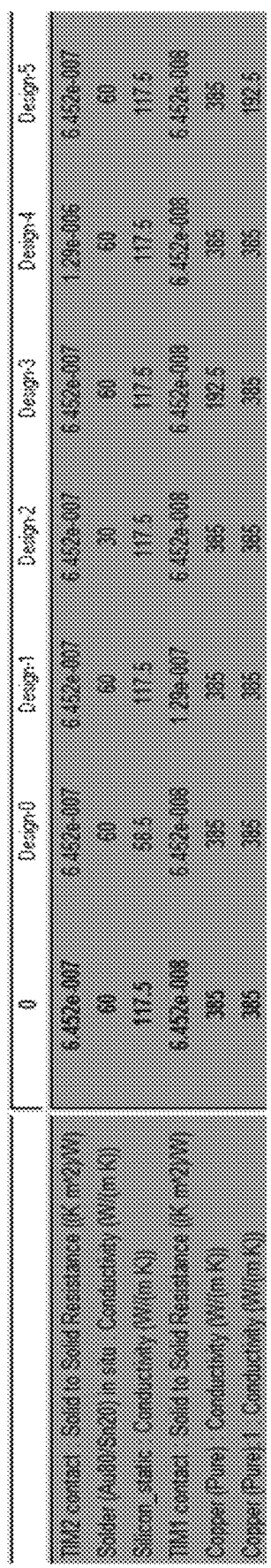
FIG. 6 illustrates a table of specific thermal resistance/conductance values for the six thermal model elements shown in FIG. 4B and six variation cases (labeled as Designs 0-5 in the figure).
Figure 7:
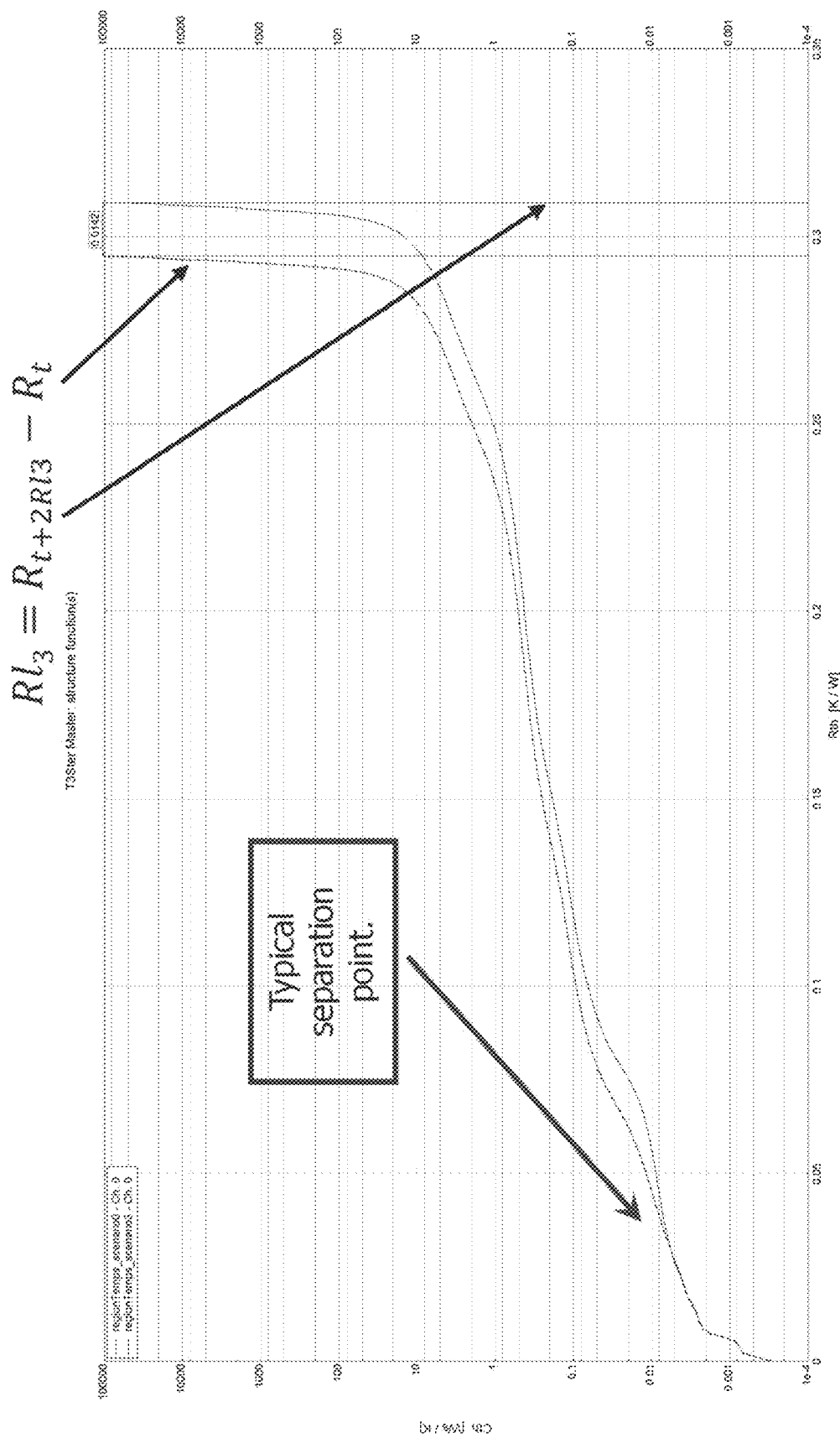
FIG. 7 illustrates the structure function obtained by halving the specific thermal conductance of the die attach layer (Design 2 in FIG. 6) along with the original structure function.

FIG. 6 illustrates a table of specific thermal resistance/conductance values for the six thermal model elements shown in FIG. 4B and six variation cases (labeled as Designs 0-5 in the figure). In each of the variation cases, one of the specific thermal resistance/conductance values is doubled/halved. The thermal simulation unit 210 performs a thermal transient response simulation for each of the six cases listed in the table. FIG. 7 illustrates the structure function obtained by halving the specific thermal conductance of the die attach layer (Design 2 in FIG. 6) along with the original structure function. The changed total thermal resistance value, indicated by $R_{t+2R13}$, is over 0.31 K/W.

In operation 330, the thermal model element resistance determination unit 220 determines thermal resistance values for the thermal model elements based on the total thermal resistance value and the changed total thermal resistance values. In the case shown in FIG. 7, the difference of the total thermal resistance values of the two cases (between the two vertical lines in the figure) is the thermal resistance contribution by the die attach layer (the thermal resistance value for the die attach) because only the thermal resistance of the die attach layer is doubled. It should be noted that the specific thermal resistance of the thermal model element layer does not have to be doubled and that a different mathematical calculation can be used to derive the thermal resistance value depending on how the thermal resistance of the thermal model element layer is changed.

Figure 8:
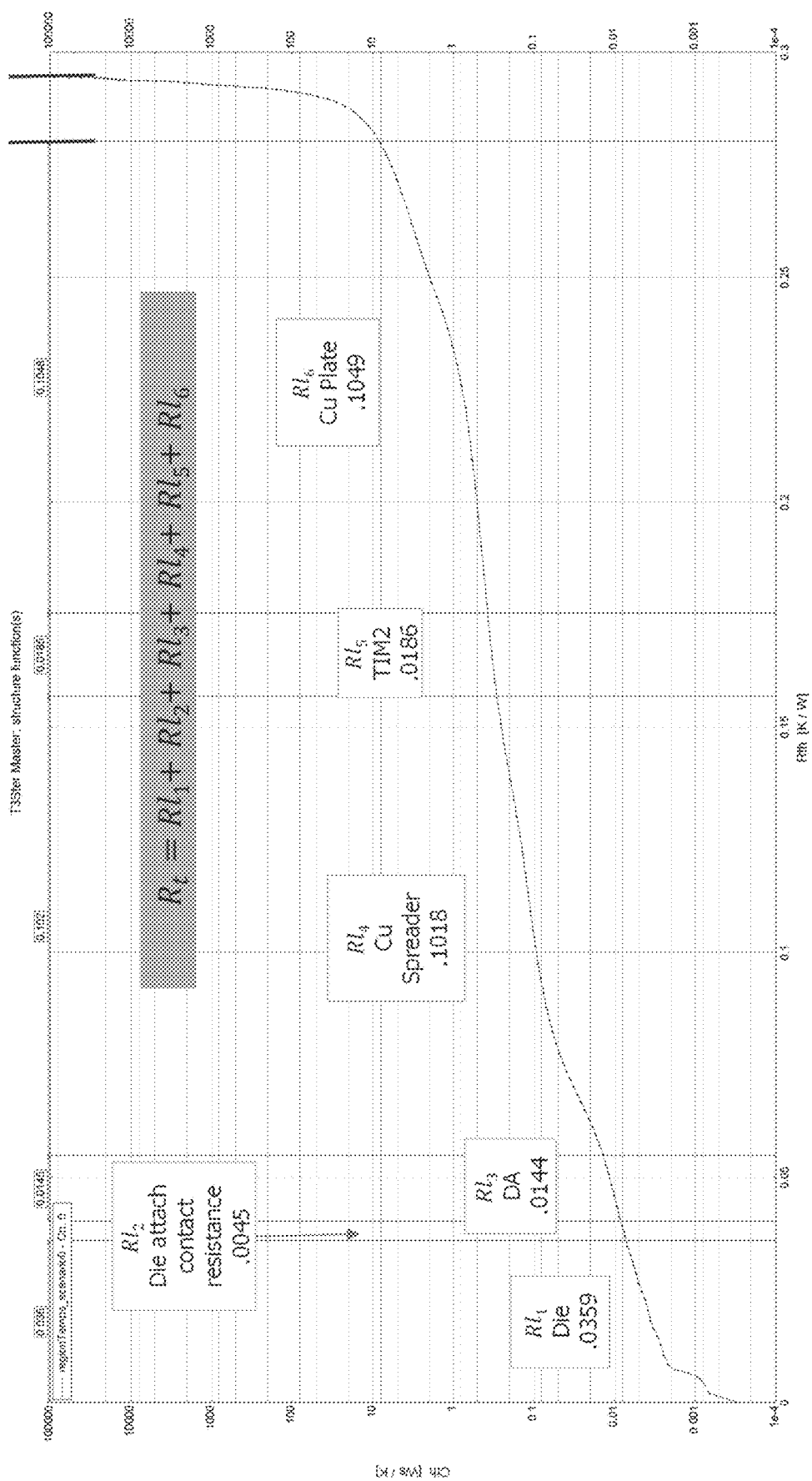
FIG. 8 illustrates an example of dividing the structure function shown in FIG. 5 into portions by stacking the thermal resistance values for the thermal model elements according to their order on the heat flow path.

In operation 340, the structure function mapping unit 230 associates portions of the structural function with the thermal model elements based on the thermal resistance values for the thermal model elements. With some implementations of the disclosed technology, the structure function mapping unit 230 can use the thermal resistance values to divide the structure function into the portions one by one following the heat flow path. FIG. 8 illustrates an example of dividing the structure function shown in FIG. 5 into portions by stacking the thermal resistance values for the thermal model elements according to their order on the heat flow path. Due to errors associated with the computed thermal resistance values, there is a gap between the total thermal resistance value of the structural function and that derived by summing over the thermal resistance values for the thermal model elements.

In an optional operation, the thermal model calibration tool 240 can calibrate a thermal model of the structure used by the thermal transient response simulation based on analyzing the portions of the structural function. A structure function derived from simulating a detailed numerical model can be compared to an experimentally derived one. Deviations between experimental and numerical structure functions indicate error sites within the detailed model and whether the thermal resistances or thermal capacitances of the numerical model would need to be increased or decreased to match the experimentally observed values. The association of portions of the structural function with the thermal model elements allows to identify the thermal model element layers of which the model parameters need to be adjusted. Iterative modifications of the detailed model, based on successive structure function comparisons, can achieve a fully calibrated detailed numerical thermal model.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic or mechanical computer-aided engineering design processes, it should be appreciated that various examples of the disclosed technology may be implemented using any desired combination of electronic or mechanical design processes.

What is claimed is:

1. A method, executed by at least one processor of a computer, comprising:
performing a thermal transient response simulation for a structure having a plurality of thermal model elements, the thermal transient response simulation determining a structure function and a total thermal resistance value, a heat flow path in the structure passing through layers of the plurality of thermal model elements;
performing a plurality of thermal transient response simulations for the structure to determine changed total thermal resistance values by varying one of thermal resistance values of the plurality of thermal model elements, each of the changed total thermal resistance values being associated with a particular thermal model element in the plurality of thermal model elements;
determining thermal resistance values for the plurality of thermal model elements based on the total thermal resistance value and the changed total thermal resistance values; and
associating portions of the structural function with the plurality of thermal model elements based on the thermal resistance values for the plurality of thermal model elements.

2. The method recited in claim 1, wherein the varying one of thermal resistance values of the plurality of thermal model elements is doubling one of thermal resistance values of the plurality of thermal model elements, and wherein the determining thermal resistance values for the plurality of thermal model elements comprising subtracting the total thermal resistance value from each of the changed total thermal resistance values.

3. The method recited in claim 1, wherein the plurality of thermal model elements and an order of the layers of the plurality of thermal model elements through which the heat flow passes are identified by analyzing design data of the structure.

4. The method recited in claim 1, further comprising:
calibrating a thermal model of the structure used by the thermal transient response simulation based on analyzing the portions of the structural function and a structure function derived from an experimental measurement.

5. The method recited in claim 1, wherein the associating comprises:
stacking the thermal resistance values for the plurality of thermal model elements along horizontal axis of the structure function.

6. The method recited in claim 1, wherein the varying one of thermal resistance values of the plurality of thermal model elements comprises:
varying one of specific thermal resistance values of the plurality of thermal model elements.

7. One or more non-transitory computer-readable media storing computer-executable instructions for causing one or more processors to perform a method, the method comprising:
performing a thermal transient response simulation for a structure having a plurality of thermal model elements, the thermal transient response simulation determining a structure function and a total thermal resistance value, a heat flow path in the structure passing through layers of the plurality of thermal model elements;
performing a plurality of thermal transient response simulations for the structure to determine changed total thermal resistance values by varying one of thermal resistance values of the plurality of thermal model elements, each of the changed total thermal resistance values being associated with a particular thermal model element in the plurality of thermal model elements;
determining thermal resistance values for the plurality of thermal model elements based on the total thermal resistance value and the changed total thermal resistance values; and
associating portions of the structural function with the plurality of thermal model elements based on the thermal resistance values for the plurality of thermal model elements.

8. The one or more non-transitory computer-readable media recited in claim 7, wherein the varying one of thermal resistance values of the plurality of thermal model elements is doubling one of thermal resistance values of the plurality of thermal model elements, and wherein the determining thermal resistance values for the plurality of thermal model elements comprising subtracting the total thermal resistance value from each of the changed total thermal resistance values.

9. The one or more non-transitory computer-readable media recited in claim 7, wherein the plurality of thermal model elements and an order of the layers of the plurality of thermal model elements through which the heat flow passes are identified by analyzing design data of the structure.

10. The one or more non-transitory computer-readable media recited in claim 7, wherein the method further comprises:
calibrating a thermal model of the structure used by the thermal transient response simulation based on analyzing the portions of the structural function and a structure function derived from an experimental measurement.

11. The one or more non-transitory computer-readable media recited in claim 7, wherein the associating comprises:
stacking the thermal resistance values for the plurality of thermal model elements along horizontal axis of the structure function.

12. The one or more non-transitory computer-readable media recited in claim 7, wherein the varying one of thermal resistance values of the plurality of thermal model elements comprises:
varying one of specific thermal resistance values of the plurality of thermal model elements.

13. A system, comprising:
one or more processors, the one or more processors programmed to perform a method, the method comprising:
performing a thermal transient response simulation for a structure having a plurality of thermal model elements, the thermal transient response simulation determining a structure function and a total thermal resistance value, a heat flow path in the structure passing through layers of the plurality of thermal model elements;

performing a plurality of thermal transient response simulations for the structure to determine changed total thermal resistance values by varying one of thermal resistance values of the plurality of thermal model elements, each of the changed total thermal resistance values being associated with a particular thermal model element in the plurality of thermal model elements;

determining thermal resistance values for the plurality of thermal model elements based on the total thermal resistance value and the changed total thermal resistance values; and associating portions of the structural function with the plurality of thermal model elements based on the thermal resistance values for the plurality of thermal model elements.

14. The system recited in claim 13, wherein the varying one of thermal resistance values of the plurality of thermal model elements is doubling one of thermal resistance values of the plurality of thermal model elements, and wherein the determining thermal resistance values for the plurality of thermal model elements comprising subtracting the total thermal resistance value from each of the changed total thermal resistance values.

15. The system recited in claim 13, wherein the plurality of thermal model elements and an order of the layers of the plurality of thermal model elements through which the heat flow passes are identified by analyzing design data of the structure.

16. The system recited in claim 13, wherein the method further comprises:

calibrating a thermal model of the structure used by the thermal transient response simulation based on analyzing the portions of the structural function and a structure function derived from an experimental measurement.

17. The system recited in claim 13, wherein the associating comprises:

stacking the thermal resistance values for the plurality of thermal model elements along horizontal axis of the structure function.

18. The system recited in claim 13, wherein the varying one of thermal resistance values of the plurality of thermal model elements comprises:

varying one of specific thermal resistance values of the plurality of thermal model elements.

* * * * *